United States Patent [19]

Kemper et al.

[11] Patent Number: 4,609,726
[45] Date of Patent: Sep. 2, 1986

[54] DISAZO DYES DERIVED FROM 3,3'-DIHALO-5,5'-DICHLOROBENZIDINE

[75] Inventors: Reinhard Kemper, Heidelberg; Egon Liedek, Esslingen, both of Fed. Rep. of Germany

[73] Assignee: BASF Aktiengesellschaft, Ludwigshafen, Fed. Rep. of Germany

[21] Appl. No.: 588,972

[22] Filed: Mar. 14, 1984

[30] Foreign Application Priority Data

Mar. 18, 1983 [DE] Fed. Rep. of Germany ....... 3309718

[51] Int. Cl.$^4$ .................. C09B 31/153; C09B 35/031; C09B 33/12; D06P 1/52
[52] U.S. Cl. .................... 534/760; 106/23; 106/288 Q; 106/308 Q; 523/460; 524/190; 525/376; 534/575; 534/581; 534/583; 534/887
[58] Field of Search .................... 260/156; 534/760

[56] References Cited

U.S. PATENT DOCUMENTS 3,565,883  2/1971  Dimroth .............................. 260/156

FOREIGN PATENT DOCUMENTS 1295117  11/1962  Fed. Rep. of Germany ...... 260/156
1719061  8/1971  Fed. Rep. of Germany ...... 260/156
2513578  9/1976  Fed. Rep. of Germany ...... 260/156
1338191  8/1963  France .
1285339  8/1972  United Kingdom .
1537383  12/1978  United Kingdom .

Primary Examiner—Floyd D. Higel
Attorney, Agent, or Firm—Keil & Weinkauf

[57] ABSTRACT

Compounds of the general formula I

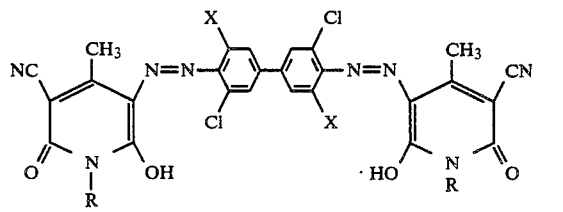

where R is hydrogen or $C_1$–$C_6$-alkyl and X is chlorine or bromine, with the proviso that X is only bromine when R is H, possess pigment properties and are distinguished by high color strength, brilliance and very good fastness properties.

2 Claims, No Drawings

DISAZO DYES DERIVED FROM 3,3'-DIHALO-5,5'-DICHLOROBENZIDINE

The present invention relates to compounds of the general formula I

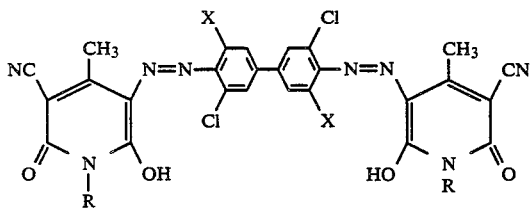

where R is hydrogen or $C_1$-$C_6$-alkyl and X is chlorine or bromine, with the proviso that X is only Br when R is H.

When X is Br, R is preferably hydrogen.

Furthermore, the compound in which R is $CH_3$ and X is Cl is preferred.

A similar compound is disclosed in German Laid-Open Application DOS No. 2,513,578. Compared with this compound, the most similar compounds according to the invention surprisingly exhibit better lightfastness (lower degree of darkening-up) and better thermal stability in plastics.

The compounds of the formula I can be prepared by reacting a tetrazonium compound of 3,3'-dihalo-5,5'-dichlorobenzidine with a pyridone of the formula

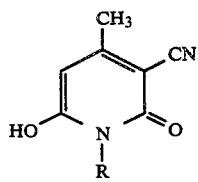

by a conventional method.

The compounds of the formula I have pigment properties and are distinguished by high color strength, brilliance and very good fastness properties.

The pigments can be obtained in a transparent or high-hiding form, depending on the preparation conditions, and can be used in printing inks and plastics, eg. polyolefins, PVC or polyesters, and for spin-dyeing.

In the examples which follow, parts and percentages are by weight, unless stated otherwise.

EXAMPLE 1

21.2 parts of 3,3'-dibromo-5,5'-dichlorobenzidine are introduced into 100 parts of 96% strength sulfuric acid at from 20° to 50° C., after which the mixture is stirred for 30 minutes at this temperature and then cooled to 5°-10° C. 34.5 parts of 40% strength nitrosylsulfuric acid are added to the mixture, which is then kept at 5°-10° C. for 2 hours. It is then poured onto 500 parts of ice water, 1 part of amidosulfonic acid is added, the mixture is filtered, and the filtrate is run into a solution of 15.5 parts of 2,6-dihydroxy-3-cyano-4-methylpyridine in 320 parts of water and 4.2 parts of sodium hydroxide. When coupling is complete, the mixture is heated at 60° C. for 1 hour, and the product is filtered off under suction, washed neutral with warm water and dried. 36.7 parts of a brilliant, red transparent pigment of the formula I, where R is H, are obtained. Mp.: 360° C.

EXAMPLE 2

100 parts of a moist press cake (solids content=25%) obtained as described in Example 1 are introduced into 500 parts of water. 40 parts of a 10% strength alkaline colophonium solution are added at 25° C., after which the pH is brought to 3 with 10% strength hydrochloric acid, the mixture is stirred for 2 hours at 25° C. and the pigment is filtered off, washed and dried. It differs from the pigment obtained as described in Example 1 in that it possesses substantially better dispersibility.

EXAMPLE 3

100 parts of a moist press cake (solids content=25%) obtained as described in Example 1 are introduced into 500 parts of water, the mixture is stirred for 8 hours at from 96° to 98° C. and then cooled to 50° C., and the compound is then filtered off under suction, washed and dried. The pigment obtained is more high-hiding than that of Example 1.

EXAMPLE 4

A tetrazo solution obtained, as described in Example 1, from 21.2 parts of 3,3'-dibromo-5,5'-dichlorobenzidine is added to a solution of 17 parts of 2,6-dihydroxy-3-cyano-1,4-dimethylpyridine in 300 parts of water and 4.2 parts of sodium hydroxide. After 2 hours at 20° C., the mixture is heated at 60° C. for 1 hour, and the product is filtered off under suction, washed with warm water and dried. 38 parts of a red pigment of the formula I, where R is $CH_3$, are obtained. Mp.: >360° C.

EXAMPLE 5

A tetrazo solution obtained, as described in Example 1, from 21.2 parts of 3,3'-dibromo-5,5'-dichlorobenzidine is added to a solution of 21.3 parts of 1-butyl-2,6-dihydroxy-3-cyano-4-methylpyridine in 300 parts of water and 4.2 parts of sodium hydroxide. After 2 hours at 20° C., the mixture is heated at 60° C. for 1 hour, and the product is filtered off under suction, washed with warm water and dried. 42.1 parts of a brilliant red pigment of the formula I, where R is $C_4H_9$ are obtained. Mp.: 295° C.

EXAMPLE 6

A tetrazo solution obtained, as described in Example 1, from 21.2 parts of 3,3'-dibromo-5,5'-dichlorobenzidine is added to a solution of 24.2 parts of 1-n-hexyl-2,6-dihydroxy-3-cyano-4-methylpyridine in 300 parts of water and 4 parts of sodium hydroxide. After 2 hours at 20° C., the mixture is heated at 60° C. for 1 hour, and the product is filtered off under suction, washed with warm water and dried. 43 parts of a red pigment of the formula I, where R is $C_6H_{13}$ are obtained. Mp.: 265° C.

EXAMPLE 7

16.1 parts of 3,3',5,5'-tetrachlorobenzidine are introduced into a mixture of 295 parts of concentrated sulfuric acid and 35 parts of 40% strength nitrosylsulfuric acid at 20° C., the mixture is heated at 50° C. until solid material is completely dissolved, and stirring is continued for 2 hours, the temperature falling to 25° C. At this temperature, the solution is introduced into 1,165 parts of ice water, 1 part of amidosulfonic acid is added and stirring is continued for a further 15 minutes.

The clear tetrazo solution is added dropwise, at 20° C., to a suspension of 17.1 parts of 1,4-dimethyl-3-cyano-6-hydroxypyrid-2-one in 400 parts of water, 13 parts of concentrated sulfuric acid and 1 part of an oxyethylated oleate.

When coupling is complete, the pigment suspension is boiled up, cooled to 40° C. and then filtered under suction, and the press cake is washed neutral with water and dried. 33 parts of a high-hiding orange red disazo pigment are obtained. Mp.: >360° C.

EXAMPLE 8

A solution of 17.1 parts of 1,4-dimethyl-3-cyano-6-hydroxypyrid-2-one in 600 parts of water and 5 parts of sodium hydroxide are added dropwise to a tetrazo solution obtained, as described in Example 7, from 16.1 parts of 3,3',5,5'-tetrachlorobenzidine.

When coupling is complete, the pigment suspension is heated at 50° C. and filtered under suction, and the press cake is washed neutral with water and dried. The orange red disazo pigment described in Example 7 is obtained in a more transparent form.

EXAMPLE 9

A tetrazo solution obtained, as described in Example 7, from 16.1 parts of 3,3',5,5'-tetrachlorobenzidine is added to a solution of 21.6 parts of 1-butyl-2,6-dihydroxy-3-cyano-4-methylpyridine in 300 parts of water and 4.2 parts of sodium hydroxide. After 2 hours at 20° C., the mixture is heated at 80° C. for 1 hour, and the product is filtered off under suction, washed with warm water and dried. 37.1 parts of an orange red pigment are obtained. Mp.: 305° C.

USE EXAMPLES (a) Printing ink 8 parts of the pigment obtained as described in Example 1, 40 parts of a colophonium resin modified with phenol/formaldehyde, and 55–65 parts of toluene are mixed thoroughly in a dispersing apparatus. The resulting red toluene-based gravure printing ink has high color strength and gives very lightfast prints.

(b) Plastic 0.05 part of a dye obtained as described in Example 1 and 50 parts of a mixture consisting of 65 parts of polyvinyl chloride powder, 35 parts of diethylhexyl phthalate and 2 parts of dibutyl-tin bis-(hexylthioglycolate) are homogenized on a roll mill at from 150° to 160° C. for about 8 minutes, milled to give hides, and polished on a calender. Brilliant red hues with excellent fastness to plasticizers are obtained.

We claim:

1. A compound of the formula

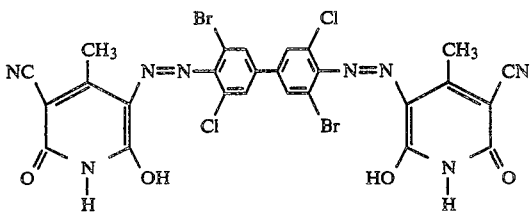

2. A compound of the formula

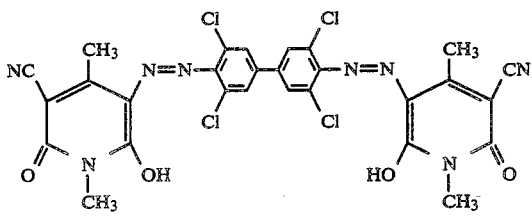

* * * * *